Jan. 18, 1955  W. M. HAWKINS, JR  2,699,798
LUBRICATED VALVE CUTOFF
Filed Nov. 8, 1950
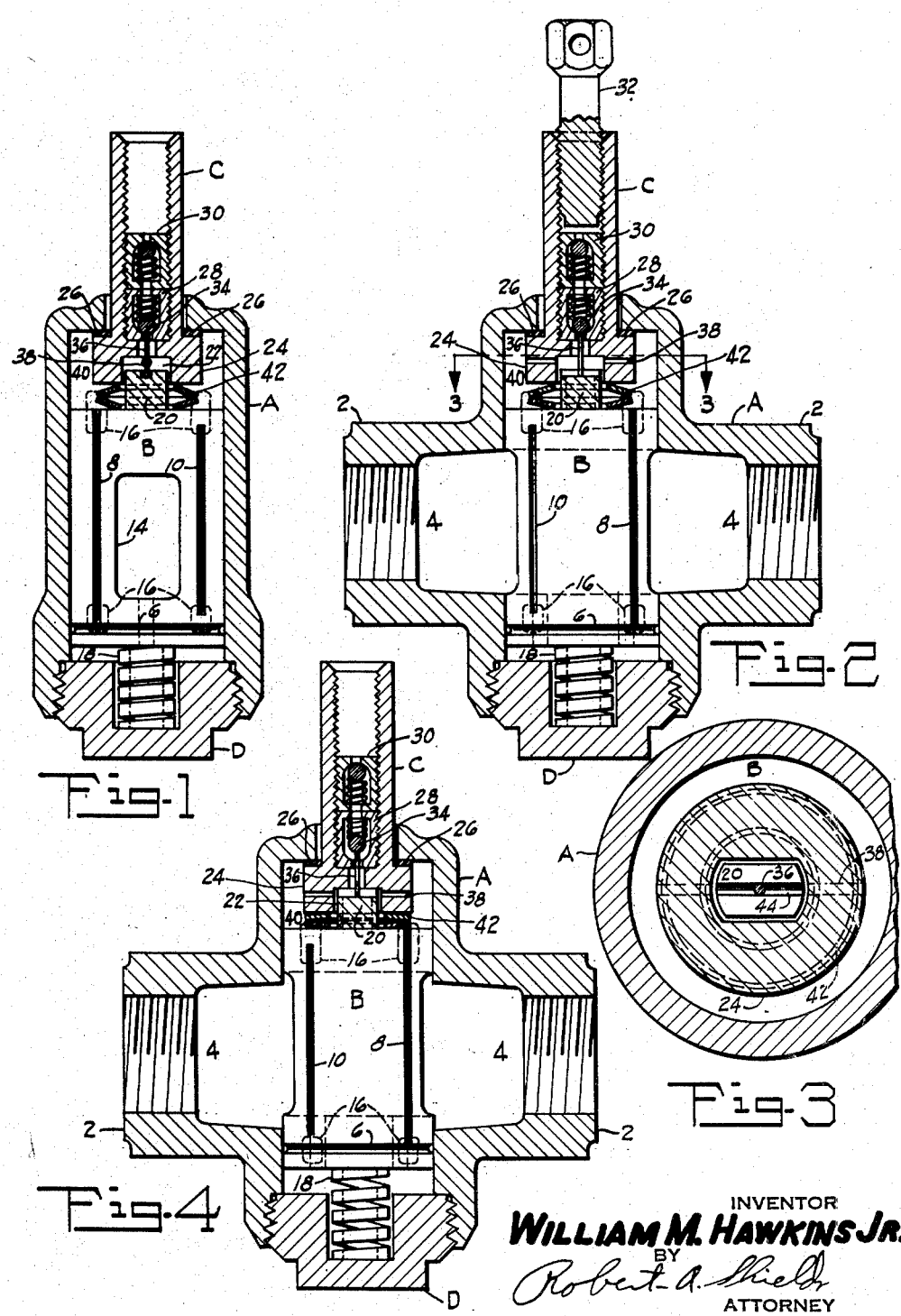
INVENTOR
WILLIAM M. HAWKINS JR.
BY
Robert A. Shields
ATTORNEY

United States Patent Office 2,699,798
Patented Jan. 18, 1955

2,699,798

LUBRICATED VALVE CUTOFF

William M. Hawkins, Jr., Glen Head, N. Y., assignor, by mesne assignments, to W-K-M Manufacturing Company, Inc., a corporation of Delaware Application November 8, 1950, Serial No. 194,680

5 Claims. (Cl. 137—246.16)

This invention relates to valves in general and in particular to lubricated valves in which a lubricant cutoff is incorporated to prevent damage to the valve.

In lubricated valves there is always possibility of destruction of the valve due to over lubrication. Previously, this has been taken care of by a shifting of the plug such as occurs in Clade Patent 2,038,886. In this patent the excess lubrication causes downward shifting of the plug with venting of the excess around the stem. Such venting may entrain foreign particles and prevent the plug from properly seating with result that neck leaks develop. It is an object of the present invention to provide a lubricated valve in which the stem can not shift and uncover the neck seat yet have provision preventing rupture by excess lubrication.

A further object of the invention is the provision of a lubricated valve having oppositely disposed check means in the stem to prevent exit or entrance of lubricant under certain conditions.

A still further object of the invention is the provision of a lubricated valve having a separate stem and plug axially shiftable relative to each other, together with control means for flow of lubricant through the stem into the valve.

These and other objects of the invention will be apparent to persons skilled in the art from a study of the following description and accompanying drawings, in which Fig. 1 is a sectional view showing the valve in a fully lubricated condition;

Fig. 2 is a sectional view taken at right angles to the section of Fig. 1;

Fig. 3 is a sectional view taken substantially on line 3—3 of Fig. 2, and

Fig. 4 is a sectional view similar to Fig. 2 but showing the parts in position to receive lubricant.

Referring now to the drawings in detail it will be seen that the valve is constructed with the customary body A, plug B, stem C and base plug D. The body is of general cruciform cross-section having ends 2 by means of which the valve may be connected to suitable piping and transversely extending passageway 4 forming a seat in which the plug B may turn and slide axially of the plug.

The plug, as clearly shown, is formed with a lower circumferential groove 6, a pair of full length longitudinally extending grooves 8 and a pair of short grooves 10. Grooves 8 extend from the upper edge of the plug downwardly and intersect with the circumferential groove 6. As shown grooves 8 and 10 are disposed on opposite sides of passageway 14 adapted to be brought into alignment with piping connections 2. In order that lubricant may be fed to short grooves 10 when the plug is in fully open or closed positions, dwarf grooves or cavities 16 are formed in the body and adapted to provide communication between the circumferential groove 6 and the space above the plug. The plug is normally urged upwardly by a relatively heavy helical spring 18 having one end seated in the base cap D and the other bearing against the lower end of plug B. A substantially rectangular projection 20 extends upwardly from the upper surface of the plug and is adapted to project into a substantially rectangular recess 22 formed in the enlarged end 24 of stem C. A gasket 26, preferably formed of tetrafluoroethylene is interposed between the overhanging shoulder of body A and the enlargement 24 of the stem, this gasket preventing any leakage between the stem and body in the neck zone. The interior of the stem is threaded to receive a lower ball check assembly 28 and the upper ball check assembly 30. As clearly shown these ball checks are in opposition to each other with the ball check 28 preventing entrance of lubricant into the valve, while the ball check 30 normally prevents exit of lubricant from the valve body. Lubricant under pressure can be introduced by means of screw or ram 32 as is customary in this type of valve. The ball 34 of ball check 28 is adapted to be urged off its seat by a pin 36 having its lower end preferably pressed into or otherwise attached to the projecting stem portion 20 of plug B. When the ball 34 is held off of its seat by pin 36 lubricant can be forced by ram 32 downwardly past ball check 30 and into the cavity 22. From this cavity lubricant may flow around the stem 20 and also through passages 38 formed in enlargement 24 into the space 40 at the upper end of plug B. Spring washers 42 are interposed between the upper end of plug B and the lower end of the stem to hold the stem in upwardly shifting position and to maintain the gasket 26 under pressure at all times.

The operation of the valve is as follows assuming the parts to be in the non-lubricated condition such as shown in Fig. 4: Lubricant under pressure forced in by ram or bolt 32 will flow past the ball check 30 and past the ball 34 held off of its seat by pin 36. It will then flow downwardly through the stem and through a groove 44 formed in the upper end of stem 20, thence outwardly through either passages 38 or downwardly around the stem 20 and out through the spring washers 42. Continued movement of lubricant through these passages into space 40 will build up pressure forcing the plug B downwardly and compressing the relatively heavy spring 18. Such movement will continue until the plug has shifted downwardly sufficiently to permit the ball 34 to be seated. As soon as the ball 34 has been seated no further lubricant can be forced into the valve and its rupture is accordingly prevented. During repeated opening and closing of the valve lubricant will gradually be dissipated and the plug will shift upwardly due to the stored energy of spring 18, thereby keeping the surfaces fully lubricated until such time as the parts have assumed the position shown in Fig. 4. As indicated in this figure further upward movement of the plug is prevented by the plug stem 20 seating against the upper end of cavity 22 in the stem C. The valve is now in condition for lubricant under pressure to shift the parts into the position as previously described and as shown in Figs. 1 and 2.

Although the invention has been described more or less in detail with specific reference to one form, it is obvious that various modifications and rearrangements of parts may be made without departing from the scope of the invention as defined by the following claims.

What is claimed is:

1. In a lubricated valve, a body, a substantially cylindrical plug mounted wholly within the body for rotational and axial sliding movements, an independent stem projecting outwardly through the body and adapted to transmit rotational movement to said plug while permitting relative axial movement therebetween means including passages in said stem to supply lubricant under pressure to the valve at one end only of the plug to cause axial shift of the plug in the body independently of the stem and means to cut off the supply of lubricant upon predetermined axial shift of the plug.

2. In a lubricated valve, a body, a substantially cylindrical plug mounted wholly within the body for rotational and axial sliding movements, an independent stem projecting outwardly through the body and adapted to transmit rotational movement to said plug while permitting relative axial movement therebetween means including passages in said stem to supply lubricant under pressure to the valve at one end only of the plug to cause axial shift of the plug in the body independently of the stem, and means to cut off the supply of lubricant upon predetermined axial shift of the plug, said last named means including a ball check in said stem preventing passage of lubricant into the valve when the ball thereof is on its seat.

3. In a lubricated valve, a body, a substantially cylindrical plug mounted wholly within the body for rotational and axial sliding movements, an independent stem projecting outwardly through the body and adapted to transmit rotational movement to said plug while permitting relative axial movement therebetween resilient means urging said plug axially of the body in one direction, means including passages in said stem to supply lubricant under pressure to the valve to cause axial shift of the plug in the opposite direction within the body independently of the stem, a check valve in said stem preventing entrance of lubricant into the valve when the check valve is seated, and means carried by said plug adapted to unseat said check valve upon upward axial movement of the plug in the body.

4. In a lubricated valve, a body, a substantially cylindrical plug mounted wholly within the body for rotational and axial sliding movements, resilient means bearing on opposite ends of said plug, an independent stem projecting outwardly through the body and held in position by one of said resilient means, a driving connection between said plug and stem adapted to transmit rotational movement therebetween while permitting relative axial movement, passages in said stem to supply lubricant under pressure to the valve at one end of the plug to cause axial shift of the plug in the body and compress one of said resilient means, a check valve in said stem preventing entrance of lubricant into the valve when the check valve is seated, and means operable during release of compression of said last named resilient means to unseat said check valve.

5. As an article of manufacture, a stem for lubricated valves comprising, an inner end portion adapted to fit within a valve body, a stem portion adapted to project outwardly through the valve body, lubricant passages in said stem and inner end portion for flow of lubricant under pressure, and a pair of check valves having opposed seats mounted in said stem and together blocking flow of lubricant in either direction between the stem and inner end portion.

References Cited in the file of this patent

UNITED STATES PATENTS

| | | |
|---|---|---|
| 1,994,618 | Nordstrom | Mar. 19, 1935 |
| 2,030,408 | Sherman | Feb. 11, 1936 |
| 2,171,590 | Milliken | Sept. 5, 1950 |